United States Patent
Tang et al.

(10) Patent No.: US 8,229,982 B2
(45) Date of Patent: Jul. 24, 2012

(54) METHOD AND SYSTEM FOR LARGE VOLUME DATA PROCESSING

(75) Inventors: Yipeng Tang, Hangzhou (CN); Wenqi Hong, Hangzhou (CN)

(73) Assignee: Alibaba Group Holding Limited, Grand Cayman, KY (US)

( * ) Notice: Subject to any disclaimer, the term of this patent is extended or adjusted under 35 U.S.C. 154(b) by 0 days.

(21) Appl. No.: 12/601,606

(22) PCT Filed: May 15, 2009

(86) PCT No.: PCT/US2009/044127
§ 371 (c)(1), (2), (4) Date: Nov. 24, 2009

(87) PCT Pub. No.: WO2009/140590
PCT Pub. Date: Nov. 19, 2009

(65) Prior Publication Data
US 2011/0072058 A1   Mar. 24, 2011

(30) Foreign Application Priority Data
May 15, 2008  (CN) .......................... 2008 1 0097594

(51) Int. Cl.
G06F 12/00 (2006.01)
G06F 17/30 (2006.01)

(52) U.S. Cl. ...................................... 707/823
(58) Field of Classification Search .................. None
See application file for complete search history.

(56) References Cited

U.S. PATENT DOCUMENTS

| | | | |
|---|---|---|---|
| 6,061,733 A | 5/2000 | Bodin et al. | |
| 6,597,918 B1 | 7/2003 | Kim | |
| 7,076,553 B2 | 7/2006 | Chan et al. | |
| 2001/0041578 A1 | 11/2001 | Na | |
| 2004/0088380 A1* | 5/2004 | Chung et al. | 709/219 |
| 2004/0268068 A1 | 12/2004 | Curran et al. | |
| 2005/0054287 A1 | 3/2005 | Kim | |
| 2005/0091230 A1* | 4/2005 | Ebbo et al. | 707/100 |
| 2005/0111451 A1 | 5/2005 | Kim | |
| 2006/0167838 A1 | 7/2006 | Lacapra | |
| 2006/0277434 A1* | 12/2006 | Tsern et al. | 714/17 |
| 2007/0136540 A1 | 6/2007 | Matlock, Jr. | |
| 2007/0288484 A1 | 12/2007 | Yan et al. | |
| 2009/0077261 A1 | 3/2009 | Broadhurst | |
| 2009/0106260 A1 | 4/2009 | Eshwar et al. | |

* cited by examiner

*Primary Examiner* — Uyen T. Le
(74) *Attorney, Agent, or Firm* — Lee & Hayes, PLLC

(57) ABSTRACT

This disclosure provides a method and a system for large volume data processing for solving the problem of system collapse caused by processing delays resulting from a failure of processing a large volume of data within a scheduled time. The method allocates a server to divide a source file into multiple small files, according to a source file naming scheme, and allocates multiple servers to distributedly process the small files. The allocation of servers can be based on the filenames named according to a file naming scheme. The disclosed method deploys multiple servers to divide and process large data files, thereby maximally improving the processing power of the system and ensuring the system to complete the processing of the files within scheduled times. Furthermore, the system promises good scalability.

20 Claims, 5 Drawing Sheets

METHOD AND SYSTEM FOR LARGE VOLUME DATA PROCESSING

RELATED APPLICATIONS

This application is a national stage application of international patent application PCT/US09/44127, filed May 15, 2009, entitled "METHOD AND SYSTEM FOR LARGE VOLUME DATA PROCESSING" and claiming priority from Chinese patent application No. 200810097594.7, filed May 15, 2008, entitled "METHOD AND SYSTEM FOR LARGE VOLUME DATA PROCESSING", which applications are hereby incorporated in their entirety by reference.

TECHNICAL FIELD

The present disclosure relates to data processing technologies, and particularly to methods and systems for large volume data processing.

BACKGROUND

Data processes are commonly observed in a number of applications. In a typical scenario, a sender saves a certain data into a file in a certain format, and then sends the file to a recipient. Upon receiving the file, the recipient analyzes content within the file, and performs logical processing accordingly.

In the above data process, if the file is not too big, and the recipient does not have a strict processing time requirement, a single server or a single thread may be used for processing. Under that circumstance, corresponding system may still operate normally, though the time taken by the recipient to process the data of these files may be quite long. However, if the file is very big (and/or the number of files is large), and the recipient has a very strict processing time requirement (e.g., the recipient may require the data of the file transmitted from the sender to be completely processed within one minute or even a shorter period of time), the processing system using single server or single thread may not be able to satisfy this need.

In many instances, file data is transferred from a sender to a recipient on a regular basis, once every five minutes, for example. In addition, the recipient may have a maximum delay tolerance for the data. If the recipient cannot complete processing the transmitted data during a corresponding interval, vicious cycle may result—unfinished processing of data from previous period and arrival of new data will increase the data delay of the recipient and eventually lead to a system collapse.

Requirement for processing such large volume of data is normally seen in a number of large-scale applications. Examples include reporting students' data from a school to an education authority in educational sector, web log processing in large-scale websites, and inter-system data synchronization, etc. Therefore, a method for processing large volume of data within a scheduled time is required to alleviate data processing delay.

SUMMARY

Disclosed are a method and a system for large volume data processing to solve the problem of system collapse caused by processing delays resulting from failure to process a large volume of data within a scheduled time.

One aspect of the disclosure is a method for processing large volume data. The method allocates a server to divide a source file into multiple small files, and allocates multiple servers to distributedly process the small files. The allocation of servers can be based on the filenames assigned according to a file naming scheme. The disclosed method deploys multiple servers to divide and process large data files, thereby improving the processing power of the system and ensuring the system to complete the processing of the files within scheduled times. Furthermore, the system promises good scalability. As files become bigger or the number of files increases, new servers may be added to satisfy the demands. The system can be linearly expanded without having to purchase more advanced servers and to re-configure and re-deploy the servers which have been operating previously.

In one embodiment, allocating the source file dividing server according to the filename of the source file is done by parsing the filename of the source file and obtaining a source file sequence number; computing (((the source file sequence number) % (total number of servers available for allocation))+1), wherein % represents a modulus operator; and allocating the source file dividing server according to computed result. Allocating the small file processing servers according to the filenames of the small files can be done in a similar manner.

The servers may also be allocated according to the data types to be processed by the servers. In one embodiment, the method configures each server to process a data type; parses a filename of a file and obtains the data type of data stored in the file; and allocates the file to a server that is configured to process the data type of the data.

After dividing the source file into small files, the method may save the small files into a disk.

In one embodiment, the method further allows the source file processing server to retry to divide the source file upon failure; and allows the plurality of small file processing servers to retry to process the respective allocated small files upon failure. The method may allow only a single retry to divide the source file, but allow multiple retries to process the allocated small files.

The method may place the source file waiting to be divided and small files waiting to be processed under different directories. In one embodiment, the data flow under the directory of the source files waiting to be divided includes the following steps:

placing the source file into a directory for to-be-divided source files;

after allocating the source file processing server, placing the source file waiting to be divided into a temporary directory for file division;

dividing the source file; and backing up the source file into a directory storing successfully divided source files if the source file has been divided successfully, and saving the small files thus obtained into a directory storing post-division small files, or backing up the source file into a directory storing source files failed to be divided if the source file has failed to be divided after a retry.

Furthermore, the data flow under the directory of the small files waiting to be processed may include the following steps:

after allocating the small file processing servers, placing the small files that are waiting to be processed into a temporary directory for small file processing;

processing the small files in the temporary directory; and backing up one or more of the small files into a directory storing successfully processed small files if the one or more small files have been processed successfully, backing up one or more of the small files into a directory storing small files having partially unsuccessfully processed records if the one or more of the small files need to be re-processed, and backing up one or more of the small files into a directory storing small files failed to be processed upon retries if the one or more of the small files have failed to be processed upon retries.

Another aspect of disclosure is a system for large volume data processing. The system includes multiple servers, with each server including a pre-processing unit, a dividing unit and a processing unit. The pre-processing unit is used for determining whether a source file waiting to be divided is to be processed by the server based on a source file naming scheme and for triggering a dividing unit if affirmative the pre-processing unit is also used for determining whether a small file is to be processed by the server based on a post-division small file naming scheme and for triggering a processing unit if affirmative. The dividing unit is used for dividing the source file into small files. The processing unit is used for performing logical processing for the small file.

In one embodiment, the pre-processing unit determines wherein whether the source file is to be processed by the server based on a source file sequence number in the filename of the source file, and determines whether the small file is to be processed by the server based on a source file sequence number in the filename of the small file or a small file sequence number in the filename of the small file.

In another development, the pre-processing unit determines whether the source is to be processed by the server based on a type of data stored in the source file. In this case, each server further has a configuration unit used for configuring data type(s) that can be processed by the server.

Preferably, each server may further include a storage unit which is used for saving small files obtained from dividing the source file into a disk. The storage unit may adopt a directory structure, and places files waiting to be divided and files waiting to be processed under different directories.

Preferably, each server may further include a retry unit used for retrying to divide the source file upon failure and/or to process the small files upon failure. The retry unit may allow a single retry to divide the source file but allow multiple retries to process the small files.

According to some of the exemplary embodiments of the present disclosure, the disclosed method and system has several potential advantages.

First, the present disclosure provides a method and a system capable of distributed and concurrent processing of large files. Under the control of a concurrency strategy, multiple servers may be deployed to divide and process large data files at the same time, thereby greatly improving processing power of a system and ensuring the system to complete processing of the file within a scheduled time. Moreover, a concurrency strategy which allocates servers for dividing and processing files based on a file naming scheme ensures that each source file is divided by just one server, and each small file obtained by dividing the source file is also processed by only one server, thereby avoiding resource competition.

Second, the present disclosure discloses several different concurrency strategies. One strategy allocates a server according to a source file sequence number in the filename. This strategy can guarantee a balance among servers when there are a relatively large number of files. Another strategy configures, for each server, a data type that is allowed to be processed by the server, and allocates a suitable server for respective file(s) waiting for processing. This latter strategy requires only modification of a configuration table when a new server is added. Depending on the practical application needs, the present disclosure may use a combination of these two concurrency strategies so that the disclosed system may maximally balance the activity levels of the servers.

Furthermore, the system promises good scalability. As files become bigger or the number of files increases, new servers may be added to satisfy corresponding demands. Specifically, the system can be linearly expanded, without having to purchase more advanced servers and to re-deploy the servers which have been operating previously.

Furthermore, in order to reduce disk IO (Input/Output) pressure, files that are waiting to be divided and files that are waiting to be processed may be placed under different directories, in which all files may be subsequently cached. A new file is read only after the files in the cache have been completely processed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In order to better understand the characteristics of the present disclosure, the disclosed method and system are described in further details using accompanying figures and exemplary embodiments.

The present disclosure provides a method and a system for processing a large file in a concurrent or distributed manner. Through a concurrency strategy which employs a file naming scheme to allocate servers, a number of servers can be deployed to divide and process the large data file at the same time. As a result the method can greatly improve the processing power of a system and ensure the system to complete the processing of a large data file within a scheduled time.

For example, a sender creates large files FileA of multiple in a certain format, and sends one or more files FileA to a recipient from time to time (e.g., in every two minutes). FileA has a large file size (e.g., 200M). The multiple types may be data types such as product data and order data, with each type possibly having multiple data files. Upon receiving the files FileA, the recipient performs subsequent logical processing of the files FileA. The logical processing may be relatively complicated, and may require a number of related matters such as saving the files FileA in a database.

In the above example, if the processing power of a single server is 10 M/Min, only 20M of data can then be processed within two minutes, leaving 180M of data remained unprocessed. In this case, a goal of the disclosed method, therefore, is to enable the system of the recipient to complete processing of all the files FileA within two minutes.

Figure 1:
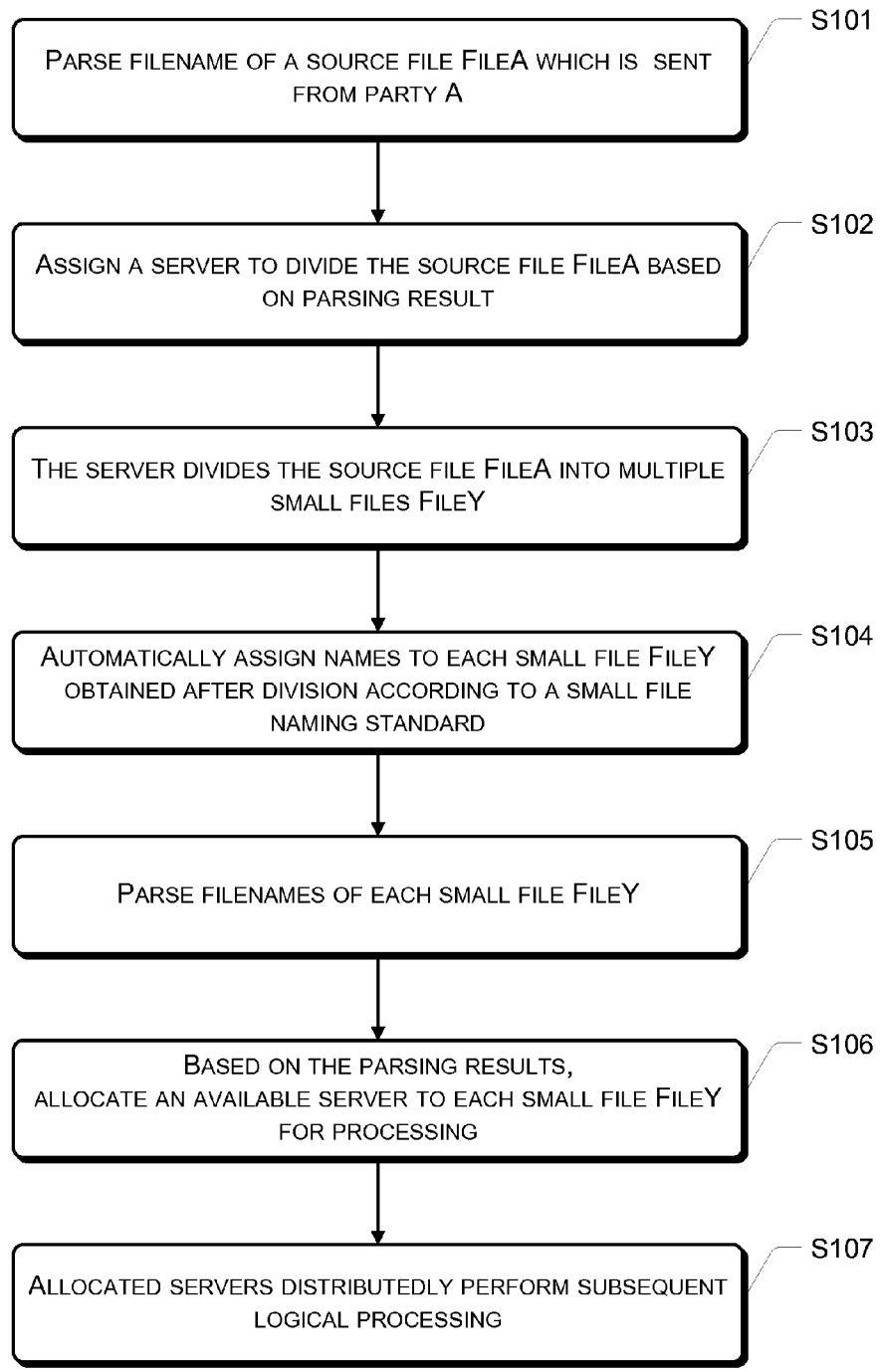
FIG. 1 shows a flow chart of an exemplary method for large volume data processing in accordance with the present disclosure.

FIG. 1 shows a flow chart of a process 100 for large volume data processing in accordance with the present disclosure. Using the above example, the present disclosure adopts a method of distributed and concurrent processing by multiple servers to process a large data file according to business logic. The multiple servers may execute the same procedures concurrently.

A prerequisite for the exemplary embodiment is that the file FileA sent from a sender is named using a unified file naming standard or file naming scheme. A file which fails to follow this naming standard will not be processed. Therefore, files sent from the sender are named according to the standard, and a recipient may directly parse the filenames.

Below uses an example of processing a file sent from a sender for illustration. In this description, the order in which a process is described is not intended to be construed as a limitation, and any number of the described process blocks may be combined in any order to implement the method, or an alternate method. The process 100 is described as follows.

At S101, a filename of a source file FileA sent from a sender is parsed.

At S102, based on a parsing result of the filename of the source file FileA, a server is allocated to divide the source file FileA.

At S103, the server divides the source file FileA into multiple small files FileY.

When a file is divided, the file is divided into N smaller files FileY. The value of N (the number of small files) is set according to practical situations, and is primarily determined by the number of servers available for processing.

At S104, each small file FileY obtained by dividing the source file FileA is named automatically according to a post-division small file naming standard.

At S105, the filenames of the small files FileY are parsed.

At S106, based on the parsing results of the filenames of each small file FileY, a server is allocated to process the small file FileY.

At S107, the allocated servers distributedly perform subsequent logical processing.

The source file and each small file (which is obtained by dividing the source file) each has its own naming rule. Specific details are given below.

An exemplary source file naming standard is as follows.

An example filename: DateTime_Sequence_DataType.TXT, where the meaning of each parameter in the file name is illustrated as follows.

DateTime represents the time when data is exported, and has a precision up to one second. An exemplary corresponding format is year, month, day, hour, minute, second (e.g., 20070209133010).

Sequence represents a sequence number of data paging (used to prevent a single file from being too large), and may also be called a source file sequence number. Sequence may be set to have three digits, with the accumulation beginning from 001.

DataType represents the type of data stored in the file. For example, "user" represents user data, "order" represents order data, and "sample" represents product data.

As shown above, each data type DataType may have multiple data files.

An exemplary post-division small file naming standard is as follows.

An example of filename:
SubDateTime_DateTime_Sequence_SubSequence_retryX_DataType.TXT, where the meaning for each parameter is described as follows.

The meaning for DateTime, Sequence and DataType is the same as that for source file.

SubDateTime represents the time when a subfile (i.e., a small file) is exported, and its default value is the same as DateTime. However, upon a retry, SubDateTime and DateTime may not be the same. Specific details is found in subsequent description for retry.

SubSequence represents a sequence number of the small file which is created upon dividing the corresponding source file. An exemplary SubSequence is set to have four digits, with the accumulation starting from 0001.

The X in retryX represents the number of retries made to process the corresponding file in practice. When the file is processed at the first time, X is 0. After one failure, X is changed to 1, and X accumulates accordingly thereafter. During accumulation, attention is made to accordingly modify the corresponding SubDateTime which is in front of retryX. An exemplary rule sets SubDateTime to be the current system time+retry time interval.

DateTime of the source file is still contained in the filename of the post-division small file. The primary purpose of keeping DateTime is to allow error checking in case a problem occurs in subsequent processing.

Blocks S102 and S106 both rely on filename parsing results to rationally allocate servers. Specifically, servers are dispatched to divide the source file and to process the post-division small files. In view of the execution of a whole server system, this is a process of concurrent execution. Specifically, at the time when one server is allocated to divide a source file, another server may be allocated to process a small file obtained in previous division.

The present disclosure provides two exemplary kinds of concurrency strategies for dividing a source file and processing a post-division small file. An exemplary principle of the concurrency strategies is to allow a source file to be divided by one server only, and to allow each post-division small file to be processed by one server only, in order to avoid resource competition.

One exemplary strategy is to apply a modulus operation to Sequence or SubSequence in the filename using the following formula:

$$(\text{Sequence/SubSequence}) \% (\text{number of servers waited for allocation})+1;$$

where "%" represents a modulus operator, and "+1" (the addition of one) ensures that a result computed will not be zero.

For example, assume that the number of available servers is three, and the filename is 20070429160001_00x_order.txt, with 00x representing Sequence.

Using the above formula, x % 3+1 is computed first. If the result is one, the corresponding file is allocated to be processed by server1. If the result is two, the file is allocated to be processed by server2. If the result is three, the file is allocated to be processed by server3.

By default, the same determination rule for allocation may be used for both processing a small file and for dividing a source file. For example, the allocation for processing the small file and the allocation for dividing the source file may both be based on Sequence in the corresponding filename. However, in order to ensure further evenness among servers, determination of allocation may preferably be based on SubSequence for processing a small file.

It is appreciated that any other suitable formula based on Sequence or SubSequence in a filename may be used for allocating the servers evenly. The above formula which uses modulus operation is only meant to be an example for illustrative purpose.

The foregoing strategy may achieve relatively even allocation of servers. However, because the number of files is not always a multiple of the number of available service (e.g., three in the present example), server1 and server2 may process a few more files than server3. Furthermore, a file having a relatively small data volume may have only one divided small file, and thus will always be processed by server1 according to this rule. Therefore, this strategy is suitable for situations where the number of the files to be processed is large. The larger the number of files is, the more the evenness among servers will be. However, if a new server is added, the number of the available servers changes to cause a different server allocation, and as a result all the servers are required to be re-deployed.

Another strategy configures, for each server, a DataType that can be processed and is only allowed to be processed by that server. According to this strategy, the system provides a configuration table, with configuration items showing, for each server, a DataType that can be processed and is only allowed to be processed by that server. For example, server1, server2 and server3 may be configured to process order data, user data and sample data, respectively. In setting these configuration items, it may be required to guarantee that no inter-server conflict exist in the configuration. If a conflict exists, a warning about the configuration error is given.

Either of the above-described concurrency strategies can schedule multiple servers for dividing source files and for processing small files at the same time well. Depending on specific application requirements, any one of the two strategies may be selected in practical applications. As the concurrency strategies are not mutually exclusive, they may preferably be combined. For example, multiple servers may be assigned to process files having "order" as DataType (i.e., files having order data), while server3 is allocated to process user data only, and server2 is allocated to process sample data only. This helps to maximize the evenness of the processing among servers, and to maximize the balance among the activities of the servers.

In the processes of dividing the source file and processing the small files as shown in FIG. 1, if the above first strategy is used, the filename of the source file is parsed to obtain Sequence, while the filename of the small file is parsed to obtain Sequence or SubSequence. If the second strategy is used, DataType is obtained from the filenames. If a combination of the two strategies is used, Sequence or SubSequence, and DataType may be obtained at the same time. No matter which concurrency strategy is adopted, which server is used for dividing or processing a file is determined upon the filename of the object file. Each server can only process the files assigned to it (the present server).

Preferably, after a server divides a source file, the corresponding post-division small files are stored into a disk. When a small file needs to be processed, the small file is obtained from the disk. If a small file obtained by dividing the source file by the server has not been completely written into a disk, this small file is not allowed to be processed. This precaution is needed because if the small file is processed in this circumstance, the content of the small file read by another server (a small file processing server) may not be complete.

Preferably, if an error occurs during division or processing, the corresponding erroneous part is re-done. Moreover, if many files are waiting to be divided or processed, the files may be processed in a chronological order.

All in all, this method of distributed and concurrent processing by multiple servers may greatly improve processing power of a system, particularly when large files are processed, and can maximally balance the activity levels of the servers. Moreover, this method promises good scalability. If files become bigger or the number of files increases, servers may be added to satisfy the demands. Specifically, the system can be linearly expanded, without having to purchase more advanced servers and to re-deploy the servers which have been operating previously.

In order to reduce the disk I/O pressure caused by file scanning, the present disclosure preferably places files to be divided and files to be processed under different directories, and cache the files in their respective directories. After a file in the cache is processed, another file is read. The processing order depends on a natural ordering of the filenames (i.e., according to the ascending order of DateTime in the filenames, with files of earlier DateTime being processed first).

An exemplary directory structure for file processing may look like the following:

| | | | |
|---|---|---|---|
| /root | | // root directory | |
| /source_file | | // directory for source files to be divided | |
| /tmp_divide | | // temporary directory used during file division | |
| /hostnameA | | // hostname of a server for current division | |
| /hostnameB | | // | |
| ... | | // these directory names are dynamically allocated according to the number of servers | |
| /source_smallfile | | // storing small files obtained from dividing the source file | |
| /tmp_execute | | //temporary directory used during processing a certain small file according to business logic | |
| /hostnameA | | // hostname of a server for current processing | |
| /hostnameB | | // | |
| ... | | // these directory names are dynamically allocated according to the number of servers | |
| /bak_sucs_file | | // backup source files that have been successfully divided | |
| /20070212 | | // current date | |
| | /hour | // hour of current date, e.g., 10, 20 | |
| /20070213 | | // | |
| | /hour | // | |
| ... | | // dynamically add according to current date | |
| /bak_sucs_small | | // backup small files that have been successfully processed | |
| /20070212 | | // current date | |
| | /hour | // hour of current date, e.g., 10, 20 | |
| /20070213 | | // | |
| | /hour | // | |
| ... | | // dynamically added according to current date | |

-continued

| | | | |
|---|---|---|---|
| /bak_error | | | // backup small files that have been recorded but partially failed to be processed |
| | /20070212 | | // current date |
| | | /hour | // hour of current date, e.g., 10, 20 |
| | /20070213 | | // |
| | | /hour | // |
| | ... | | // dynamically add according to current date |
| /error_divide | | | // backup source files which have had an error in dividing to small files |
| | /20070212 | | // current date |
| | | /hour | // hour of current date, e.g., 10, 20 |
| | /20070213 | | // |
| | | /hour | // |
| | ... | | // dynamically added according to current date |
| /error_execute | | | // backup small files that have been processed unsuccessfully with retry failure exceeding five times |
| | /20070212 | | // current date |
| | | /hour | // hour of current date, e.g., 10, 20 |
| | /20070213 | | // |
| | | /hour | // |
| | ... | | // dynamically add according to current date |

The above directory structure is used in these exemplary embodiments for illustrative purposes only. The directory structure may be self-adjusted. For example, whether /hour directory is needed depends on the number of small files obtained from dividing the source file by the system. Because an operating system has restrictions on the number of files, the size of directory tree, and the maximum number of files under a directory, performance of the system may be severely affected if the number of files under one directory is too large.

In practice, the process of creating the above directory structure is in synchronization with the processes of dividing the source file and processing the small files shown in FIG. 1, and may reflect the process shown in FIG. 1 Through data flow of files across directories. Such process primarily includes data flows in file division and file processing. Specific details are described as follows.

Figure 2:
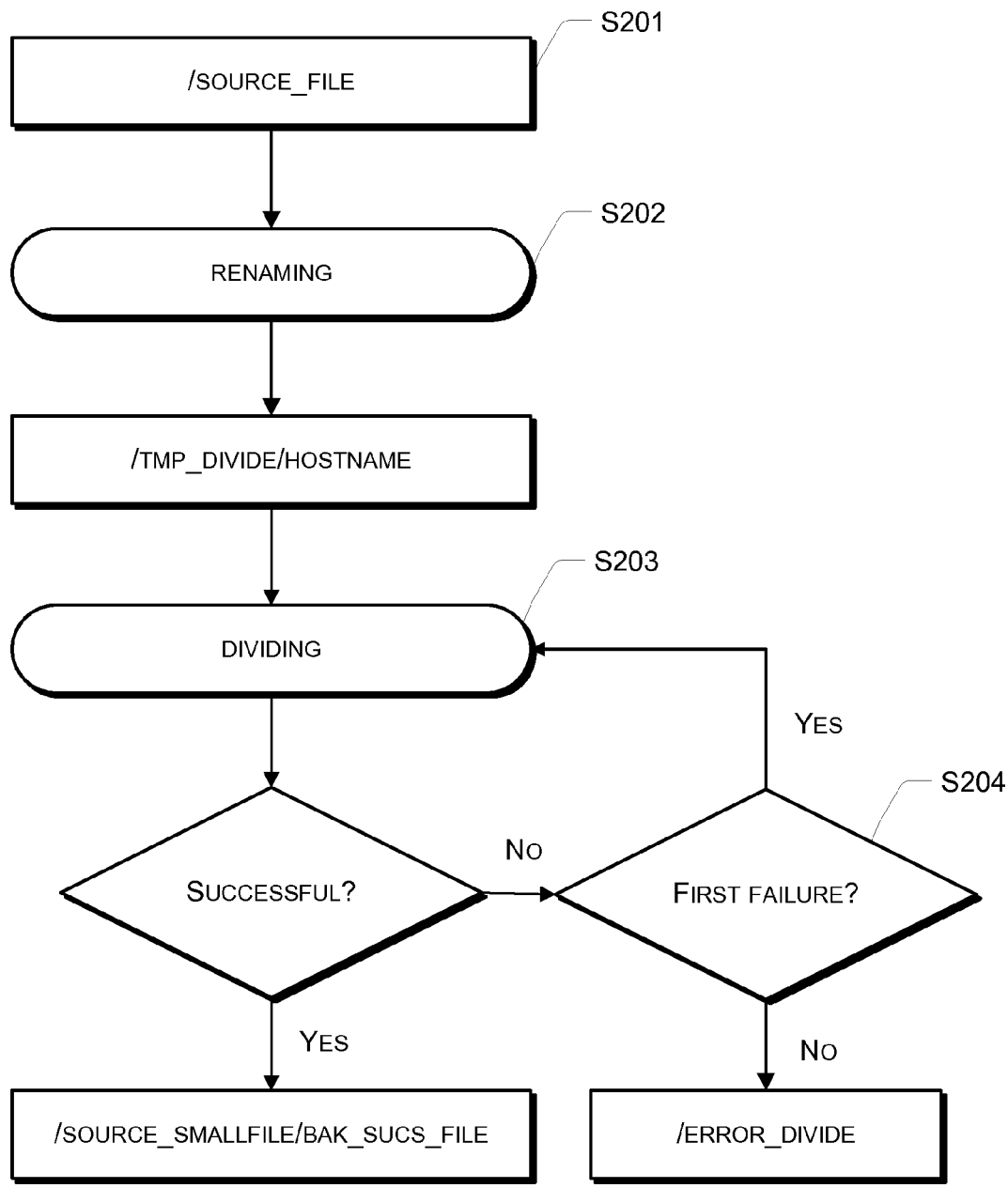
FIG. 2 shows a flow chart an exemplary process of dividing a file in a directory structure.

FIG. 2 shows a flow chart illustrating a process 200 of dividing a large source file in a directory structure in accordance with the present disclosure. The process 200 is described with reference to the directory structure described above below.

At S201, a source file transmitted from a sender is placed under a directory /source_file.

At S202, the source file which is under the directory /source_file and waiting to be divided is allocated a server based on its filename. In order to avoid dividing the same source file by multiple threads, the file is further placed under a corresponding directory /tmp_divide/hostname, which is preferably a directory of the allocated server. This process is referred to as renaming.

At S203, the server divides the source file which is waiting to be divided. If the source file is successfully divided, small files obtained from the division are saved under a directory /source_smallfile. The source file which has been divided successfully is backed up under a directory /bak_sucs_file.

At S204, if the above dividing process fails, a retry to divide is attempted. If the first try is successful, the process returns back to S203, and the small files obtained from the division are saved under a directory /source_smallfile. The source file which has been divided successfully is backed up under a directory /bak_sucs_file. If the retry also fails, the source file is backed up under a directory /error_divide.

Figure 3:
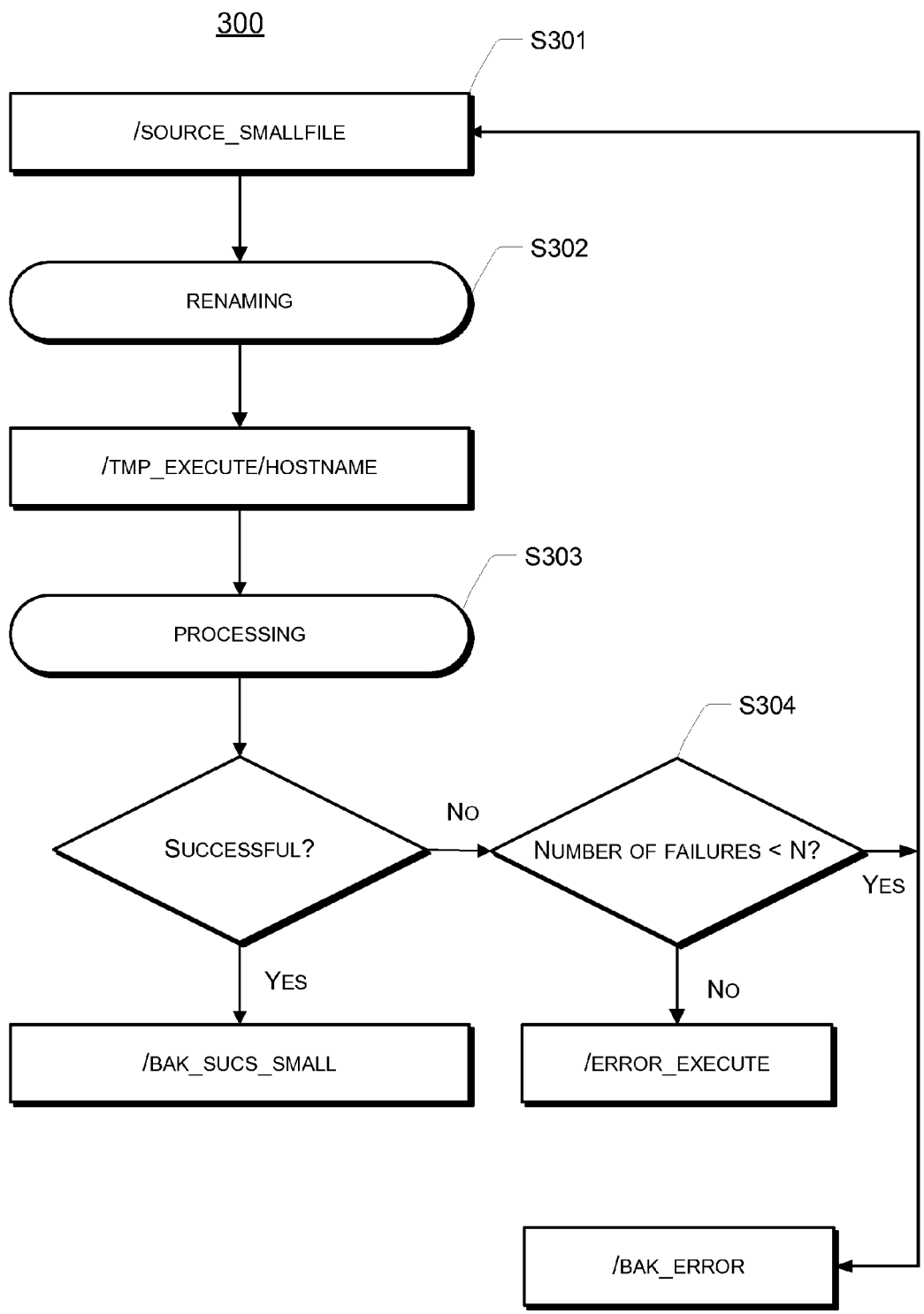
FIG. 3 shows a flow chart of an exemplary process of processing a file in a directory structure.

FIG. 3 shows a flow chart illustrating a process 300 of processing a post-division small file in a directory structure in accordance with the present disclosure. The process 300 is described with reference to the directory structure described above.

At S301, a small file obtained from dividing the source file is placed under a directory /source_smallfile.

At S302, the small file which is under the directory /source_smallfile and waiting to be processed is allocated a server based on its filename. In order to avoid processing the same small file by multiple threads, the small file is further placed under corresponding directory /tmp_execute/hostname, which is preferably a directory of the allocated server. This process is called renaming.

At S303, the allocated server logically processes the small file that is waiting to be processed. If successful, the processed small file is saved under a directory /bak_sucs_small.

At S304, if an error occurs in processing, a retry is attempted. The number of allowable retries may be set to be five, for example.

The small file which is waiting for a retry for processing is backed up under a directory /bak_error. When a retry is attempted, the process returns to S301. Specifically, the small file which has failed to be processed at S303 is placed back under the directory /source_smallfile, and processed again by the originally allocated server. If the number of unsuccessful retries exceeds the maximum number of retries allowed (e.g., five times), the small file is backed up under a directory /error_execute.

In the exemplary embodiments, the number of retries to divide a source file and the number of retries to process a small file are not the same. If an error occurs in dividing a large source file, a retry to divide is made. If the retry still fails to divide, the source file is transferred directly to "error directory" (i.e., /error_divide). An error log is written while a warning is provided. However, a more flexible retry mechanism is used to handle an error occurring in the business logic processing of a small file. Because the error rate for dividing a source file is very small, but failures for the subsequent business logic processing occur more frequently, multiple retries are allowed for processing small files.

Because multiple retries may be attempted for a small file, a list of retry intervals is configured. The number of allowable retries and the duration needed to be waited before making the next retry may be set manually. For example, the number of allowable retries may be set to be five. If five unsuccessful retries have been made, the small file will not be processed, but transferred to "error directory". An error log is written while a warning is provided. Therefore, when a server obtains a specific file for processing, the server needs to determine whether SubDateTime of that file is earlier than the current time. If yes, the server processes the file. Otherwise, the file is not processed.

As described above, if a small file obtained from dividing the source file by a certain server has not been written completely into a disk, this small file is not allowed to be processed. In order to avoid processing of a small file which has not been completely written into a disk, a directory structure is used. The small file is first written to a temporary directory /source_smallfile. Upon successful writing, the small file is renamed, and transferred to another directory /tmp_execute/hostname. Because the renaming is atomic, and only a file pointer needs to be modified, this will guarantee the integrity of the data.

The present disclosure further provides an exemplary system for large volume data processing.

Figure 4:
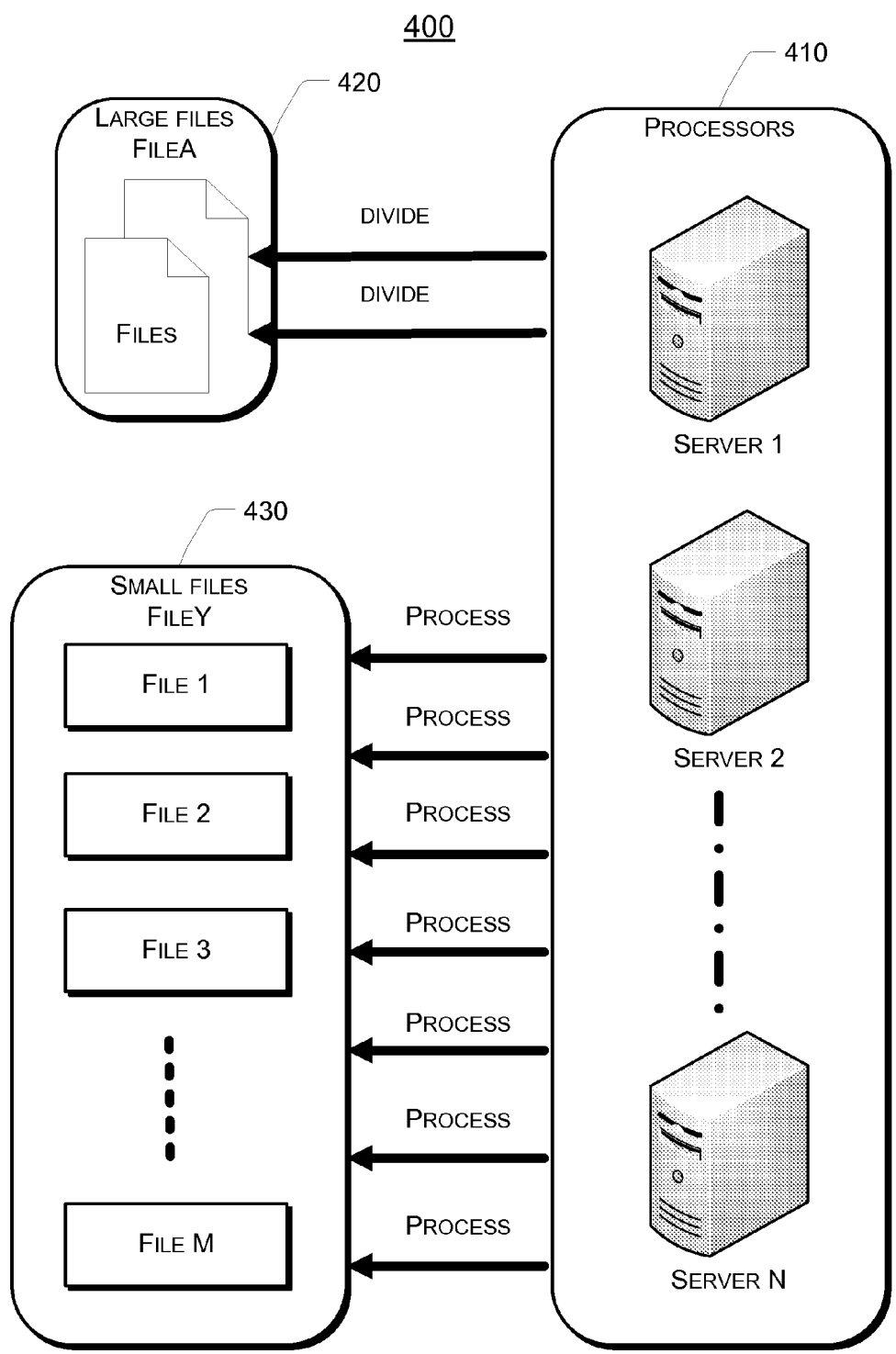
FIG. 4 shows a logical structural diagram of a system for large volume data processing in accordance with the present disclosure.

FIG. 4 shows a logical structural diagram of a system 400 for large volume data processing in accordance with the present disclosure.

As shown in FIG. 4, system 400 adopts a distributed structure including multiple servers 410, with each server having the abilities of dividing source files 420 and processing small files 430 obtained from dividing the source files 420. In the context of an example of processing data transferred from a sender to a recipient within a scheduled time, the system 400 is deployed on the recipient side and is referred to as recipient system 400 below. The multiple servers 410 of the recipient system 400 may execute the same procedures concurrently.

An exemplary process of concurrent processing a large source file FileA sent from a sender by multiple servers 410 of the recipient system 400 is described as follows.

A large file FileA (420) is first placed under a directory /source_file. Each server 410 constantly scans large files 420 which are sent from the sender and placed under this directory. Based on the foregoing concurrency strategies (which is not described here again), each server serverA (410) determines based on the file's filename whether a file 420 is to be divided by the present server. Upon obtaining a file FileA needed to be processed by the present server, the server serverA divides the file into N smaller files FileY. The value of N depends on practical situations and is primarily determined by the number of servers 410 available to be used for processing the small files. According to one concurrency strategy, the multiple servers serverX further determine whether any of the small files FileY obtained from dividing the source file is/are to be processed by the multiple servers serverX. Upon obtaining a small file FileY which is to be processed by server serverB, for example, the server serverB performs subsequent logical processing of the small file FileY.

In the above process, in order to prevent resource competition, it is preferred to ensure that only one server is allowed to divide the source file FileA, and only one server is allowed to process each of the small files FileY obtained from dividing the source file FileA. Moreover, the activity levels of each server are balanced to the maximum extent to avoid situations in which certain servers are too busy while other servers are idling. This can be accomplished by the concurrency strategies described in this disclosure. Furthermore, the disclosed system is very flexible, has good scalability, and can support independent configuration of each server for processing certain types of files. In some embodiments, therefore, in case a new server is added, previously operated servers are not required to be reconfigured and deployed again with a new configuration.

Preferably, in order to ensure read integrity of small files, after a source file is divided, the small files obtained from dividing the source file are saved into a disk. Furthermore, if an error occurs in the file division or file processing, the erroneous part is processed again. If a lot of files are waiting to be divided or processed, the files will be divided or processed in a chronological order.

Figure 5:
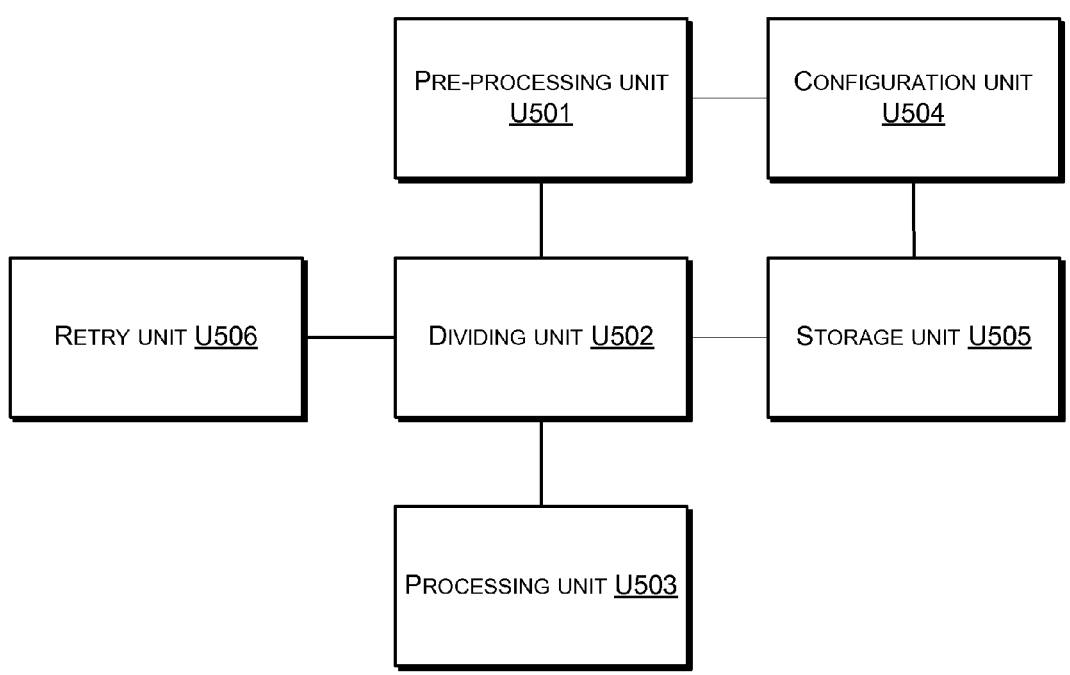
FIG. 5 shows a diagram illustrating an exemplary internal logical structure of each server in the system of FIG. 4.

FIG. 5 shows a structural diagram of an internal logic 500 of a server 410 in the system 400. The internal logic 500 includes a pre-processing unit U501, a dividing unit U502 and a processing unit U503.

The pre-processing unit U501 is used for scanning a directory of a disk on a regular basis to determine whether a file within the directory is to be processed by the server 410. Specifically, the pre-processing unit U501 determines whether a source file is to be divided by the server 410. The determination is based on the filename of the source file which is assigned according to a source file naming scheme. If the answer is affirmative, the pre-processing unit U503 triggers a dividing unit U502 to divide the source file. The pre-processing unit U501 may further determine whether a small file is to be processed by the server 410. The determination is based on the filename of the small file which is assigned according to a post-division small file naming scheme. If yes, the pre-processing unit U501 triggers a processing unit U502 to process the small file. The dividing unit U502 is used for dividing the source file into small files. The processing unit U503 is used for performing logical processing of the small file which, according to the above determination, is to be processed by the server 410.

According to the concurrency strategies described above, if the first strategy is used, the pre-processing unit U501 determines whether a source file is to be processed by the server 410 based on a source file sequence number in the file's filename, and determines whether a small file is to be processed by the server 410 based on a corresponding source file sequence number in the small file's filename or a small file sequence number in the small file's filename.

If the second strategy is adopted, the pre-processing unit U501 determines whether a source file is to be divided by the server 410 based on the type of data stored in the source file. The server 410 further includes a configuration unit U504 which is used for configuring data type(s) that can be processed by the server 410. During determination, the pre-processing unit U501 determines whether data type of the data stored in the source file is the type that can be processed by the server 410.

Preferably, in order to guarantee read integrity of small files obtained from dividing the source file, the server 410 may further include a storage unit U505 which is used for saving the small files into a disk. Moreover, in order to reduce disk IO pressure caused by file scanning, the storage unit U505 adopts a directory structure, and places files that are waiting to be divided and files that are waiting for processing under different directories.

Preferably, the server may further include a retry unit U506, which is used for retrying to divide a source file or to process a small file upon operation failure. Based on application needs, a single retry is attempted to divide a source file, while multiple retries may be attempted to process a small file.

In conclusion, the system 400 supports concurrent executions by multiple servers 410 for improving processing power of the system 400. The system 400 described also has a very good scalability.

Any details of the system 400 left out in FIG. 4 and FIG. 5 can be found in related sections of the method disclosed in FIG. 1, FIG. 2 and FIG. 3, and therefore are not be repeated here.

It is appreciated configurations alternate to the above recipient system 400 may also be used. For example, servers 410 may be divided into two groups, one placed on the sender's side, and the other on the receiving side. The source file is divided by the first group of servers on the sender's side and the resultant post-division small files are sent to the recipient side to be processed by the second group of servers. Alternatively, the system may not involve a sender and recipient but has only one side which contains multiple servers to conduct filed division and file processing.

The method and the system for large volume data processing in the present disclosure have been described in detail above. Exemplary embodiments are employed to illustrate the concept and implementation of the present disclosure in this disclosure.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for large volume data processing, the method comprising:
    assigning a filename to a source file according to a source file naming scheme;
    distributing the source file to a source file dividing server according to the filename of the source file to divide the source file into a plurality of small files;
    assigning filenames to the plurality of small files according to a small file naming scheme; and
    distributing the plurality of small files to a plurality of small file processing servers according to the filenames of the small files to process the plurality of small files.

2. The method as recited in claim 1, wherein distributing the source file comprises distributing the source file according to a sequence number of the source file and a number of source file dividing servers that are available, the sequence number being specified in the filename of the source file.

3. The method as recited in claim 1, wherein the distributing the plurality of small files comprises distributing the plurality of small files according to sequence numbers of the small files and a number of small file processing servers that are available, the sequence numbers being specified in the filenames of the small files.

4. The method as recited in claim 1, wherein the distributing the source file comprises distributing the source file to the source file dividing server according to a type of the data associated with the source file.

5. The method as recited in claim 1, wherein the distributing the plurality of small files comprises distributing a small file of to a server of the plurality of small file processing servers according to a data type of the small file.

6. The method as recited in claim 1, further comprising saving the plurality of small files into a disk.

7. The method as recited in claim 1, further comprising:
    allowing the source file dividing server to retry to divide the source file upon failure; and
    allowing the plurality of small file processing servers to retry to process the small files upon failure.

8. The method as recited in claim 7, wherein only a single retry is allowed to divide the source file, and multiple retries are allowed to process the plurality of small files.

9. The method as recited in claim 1, further comprising:
    storing the source file under a directory; and
    storing the plurality of small files under another directory.

10. The method as recited in claim 1, further comprising:
    storing the source file in a directory for to-be-divided source files after receiving the source file;
    storing the source file in a temporary directory for file division before the distributing of the source file;
    determining whether the dividing of the source file fails;
    in the event that the dividing of the source file does not fail, storing the source file in a directory for successfully-divided source files; and
    in the event that the dividing of the source file fails, storing the source file in a directory for unsuccessfully-divided source files.

11. The method as recited in claim 1, further comprising:
    storing a small file of the small files into a directory storing post-division small files;
    storing the small file in a temporary directory for small file processing before the small file is processed;
    determining whether processing the small file fails;
    in the event that the processing of the small file does not fail, storing the small file in a directory for successfully-processed small files; and
    in the event that the processing of the small file fails, storing the small file in a directory for unsuccessfully-processed small files.

12. A method for large volume data processing, the method comprising:
    assigning a filename to a source file according to a source file naming scheme;
    allocating a source file dividing server according to the filename of the source file to divide the source file into a plurality of small files;
    assigning filenames to the plurality of small files according to a small file naming scheme;
    allocating a plurality of small file processing servers according to the filenames of the small files to distributedly process the plurality of small files; and
    processing the plurality of small files by the allocated small file processing servers.

13. The method as recited in claim 12, wherein the source file naming scheme defines at least one of a time when the source file is exported, a sequence number of the source file, or a data type associated with the source file.

14. The method as recited in claim 12, wherein the small file naming scheme defines at least one of a time when a small file of the small files is exported, a sequence number of the small file, or a number of retries made to process the small file.

15. A system memory comprising computer-program instructions executable by a processor, the computer-program instructions when executed by the processor for performing acts comprising:
    assigning a filename to a file based on a source file naming scheme;
    distributing the file to a server of the system based on the filename to generate multiple divided files;

determining whether the generating of the multiple divided files fails;

in the event that the generating of the multiple divided files does not fail, storing the file in a directory for successfully-divided files;

in the event that the generating of the multiple divided files fails, storing the file in a directory for unsuccessfully-divided files;

assigning another filename to a divided file of the multiple divided files based on a division file naming scheme; and distributing the divided file to another server of the system based on the other filename.

16. The system memory as recited in claim 15, wherein the acts further comprise:

receiving the file;

processing the divided file;

determining whether the processing of the divided file fails;

in the event that the processing of the divided file does not fail, storing the divided file in a directory for successfully-processed divided files; and in the event that the processing of the divided file fails, storing the divided file in a directory for unsuccessfully-processed divided files.

17. The system memory as recited in claim 15, wherein the source file naming scheme defines at least one of a time when the file is exported, a sequence number of the file, or a data type associated with the file, and the server is different from the other server.

18. The system memory as recited in claim 15, wherein the division file naming scheme defines at least one of a time when the divided file is exported, a sequence number of the divided file, or a number of retries made to process the divided file.

19. The system memory as recited in claim 15, wherein the source file naming scheme defines at least one of a sequence number associated with the file or a type of data associated with the file, and the distributing the file comprising distributing the file based at least on one of the sequence number or the type of the data.

20. The system memory as recited in claim 15, wherein the division file naming scheme defines at least one of a sequence number associated with the divided file or a type of data associated with the divided file, and the distributing the divided file comprising distributing the dividing file based at least on one of the sequence number or the type of the data.

* * * * *